Patented July 10, 1923.

1,461,351

UNITED STATES PATENT OFFICE.

DANIEL E. HAKES AND AUGUST LAPEROU, OF CALEXICO, CALIFORNIA.

CLEANING COMPOSITION.

No Drawing.     Application filed December 17, 1919.   Serial No. 345,463.

*To all whom it may concern:*

Be it known that we, DANIEL E. HAKES, a citizen of the United States, and AUGUST LAPEROU, a citizen of France, residing at Calexico, in the county of Imperial and State of California, have jointly invented a new and useful Cleaning Composition, of which the following is a specification.

This invention relates to a new composition of matter, intended more particularly for cleansing purposes, and combining therewith certain healing and antiseptic properties, and for which a patent of Canada, No. 204211, was granted to us on the 21st day of September, 1920.

The composition is particularly adapted for use upon the person and for cleansing the hands, and the advantage of this compound is the combination with the several antiseptic and saponaceous ingredients, of an abrasive ingredient which is in itself an effective cleansing agent.

Another object of this invention is to produce a cleansing substance which may be used in a wet or dry condition, and with or without the use of additional water, and to produce a cleansing substance capable of being kept for an indefinite time in prepared form ready for use.

The proportions of the ingredients which we prefer to use, and which we have found to be best for the purpose, may be stated as follows:

| | |
|---|---|
| Olive oil | 1 oz. |
| Water | 1 quart. |
| Soap bark (obtained from tucca) | 2 oz. |
| Washing powder | 6 oz. |
| Glycerine | 1 oz. |
| Turpentine | ¼ oz. |
| Aqua ammonia (household) | ¼ oz. |
| Baking soda | 2 oz. |
| Sawdust (granulated wood flour) | 1½ quarts. |

The soap bark (obtained from the root of yucca, a kind of cactus) is boiled for a period of fifteen minutes in water, and is then strained, and then the remaining ingredients, except the sawdust, are added, and the solution is heated over a slow fire until almost to a boiling heat. To the resultant paste is then added the sawdust, which is briskly stirred into the mixture.

We are aware that most of the ingredients have been heretofore used in soap mixtures or in cleaning compounds, and we do not claim them separately, but only when combined as herein stated. The olive-oil and glycerine afford an effective vehicle for spreading the ammonia and soda, and for softening the skin so that the action of these ingredients may be more efficacious. The proportions of the ingredients are so chosen that any material deviation therefrom would render impossible the desired healing and antiseptic properties.

When cooled, the paste is ready for use, and is well adapted for use, wet or dry, and as a paste, or in a powdered form, and with or without the use of water.

The emulsive paste derived from the soap bark, forms a vehicle for the alkaline and detergent ingredients, and, when combined with the sawdust, is effective for the purposes for which it is intended.

What is claimed is:

The herein described composition of matter, consisting of olive oil, 1 ounce; water, 1 quart; the extractive matter of two ounces of soap bark; washing powder, 6 ounces; glycerine, 1 ounce; turpentine, ¼ ounce; aqua ammonia, ¼ ounce; baking soda, 2 ounces; and wood flour, 1½ quarts, all mixed and boiled to form a paste.

In testimony whereof, we hereunto affix our signatures.

DANIEL E. HAKES.
AUGUST LAPEROU.